United States Patent
Russell et al.

(10) Patent No.: US 10,125,452 B2
(45) Date of Patent: Nov. 13, 2018

(54) ARTICLE ASSEMBLY DISASSEMBLY SYSTEM

(71) Applicants: NONWOVENS INNOVATION & RESEARCH INSTITUTE, Leeds, Yorkshire (GB); C-TECH INNOVATION LTD, Capenhurst, Chester, Cheshire (GB)

(72) Inventors: Stephen John Russell, Harrogate (GB); Charles Rea, Chester (GB); Robert Stuart Ellis Bell, Chester (GB); Norman Maloney, Clwyd (GB)

(73) Assignee: WEAR2GO B.V., Valkenswaard (NL)

( * ) Notice: Subject to any disclaimer, the term of this patent is extended or adjusted under 35 U.S.C. 154(b) by 517 days.

(21) Appl. No.: 14/409,303

(22) PCT Filed: Jun. 18, 2013

(86) PCT No.: PCT/EP2013/062671
§ 371 (c)(1),
(2) Date: Dec. 18, 2014

(87) PCT Pub. No.: WO2013/189956
PCT Pub. Date: Dec. 27, 2013

(65) Prior Publication Data
US 2015/0167230 A1    Jun. 18, 2015

(30) Foreign Application Priority Data
Jun. 18, 2012 (GB) .................................. 1210798.3

(51) Int. Cl.
*D06H 7/22* (2006.01)
*B02C 23/00* (2006.01)
(Continued)

(52) U.S. Cl.
CPC ............. *D06H 7/221* (2013.01); *B02C 23/00* (2013.01); *B29B 17/0026* (2013.01);
(Continued)

(58) Field of Classification Search
CPC ....................................................... D06H 7/221
(Continued)

(56) References Cited

U.S. PATENT DOCUMENTS

| 4,722,121 A | 2/1988 | McPeak et al. |
| 5,396,715 A | 3/1995 | Smith |

(Continued)

FOREIGN PATENT DOCUMENTS

| DE | 3505571 | 8/1986 |
| JP | 1181027 | 3/1999 |

(Continued)

OTHER PUBLICATIONS

International Search Report for PCT/EP2013/062671, Completed by the European Patent Office dated Oct. 23, 2013, 5 Pages.
(Continued)

*Primary Examiner* — Brent T O'Hern
(74) *Attorney, Agent, or Firm* — Brooks Kushman P.C.

(57) ABSTRACT

There is described a system, article, method, connectors and apparatus for article reuse or recycling, which system including the assembling of an article from at least two components at least one of which has a textile material brought into communication with each other through one or more connectors and the subsequent disassembling of the article and use of one or more of the components in the assembling stage. The assembled article is susceptible to automatic or semi-automatic disassembly through one or more of its connectors being susceptible to a reduction in one or more mechanical properties under exposure of the article to electromagnetic energy especially microwave. The
(Continued)

article may be a garment that has joins stitched with a microwave susceptible yarn. The yarn is ideally manufactured from pseudo-conductive materials and is metal free.

35 Claims, 6 Drawing Sheets

(51) Int. Cl.
*B29B 17/00* (2006.01)
*B29L 31/00* (2006.01)
*B29B 17/02* (2006.01)

(52) U.S. Cl.
CPC .............. *D06H 7/225* (2013.01); *B29B 17/02* (2013.01); *B29K 2313/02* (2013.01); *B29K 2913/00* (2013.01); *B29L 2031/726* (2013.01); *Y02W 30/62* (2015.05); *Y02W 30/622* (2015.05)

(58) Field of Classification Search
USPC ....................................................... 428/102
See application file for complete search history.

(56) References Cited

U.S. PATENT DOCUMENTS

2003/0219566 A1* 11/2003 Berkowitz ............. A47G 9/062
428/100
2009/0314678 A1* 12/2009 Stein ........................ A45C 3/04
206/494

FOREIGN PATENT DOCUMENTS

| JP | 2009001734 | 1/2009 |
| KR | 20090130948 | 12/2009 |
| WO | 2004082938 | 9/2004 |
| WO | 2010109410 | 9/2010 |

OTHER PUBLICATIONS

Wall et al. Textile Research Journal 1971, p. 32-38, "A Study of the Spectral Distributions of Sun-Sky and Xenon-Arc Radiatio n in Relation to the Degradation of Some Textile Yarns."

Nihon Sanmo Dyeing Co. LTD. Feb. 1, 2001, 2 Pages, "Development Fiber and Products, Conductive fiber Thunderon."

Russell et al. Waste and Resource Management 163, Nov. 2010, Issue WR4, p. 165-172, "Principles of the recovery and reuse of corporate clothing."

Website http://www.marktek-inc.com/doc/Thunderon-ds.pdf, Retrieved from the Wayback Machine on Jan. 22, 2018, Dated May 10, 2008, All together 4 Pages, "Marktek Inc. Your One-Step Shop for EMI-Shielding, Conductive, Resistive, & Microwave-Absorptive Materials, Data Sheet for Thunderson® Conductive Fibers".

* cited by examiner

ARTICLE ASSEMBLY DISASSEMBLY SYSTEM

CROSS-REFERENCE TO RELATED APPLICATION

This application is the U.S. national phase of PCT Application No. PCT/EP2013/062671 filed on Jun. 18, 2013, which claims priority to GB Patent Application No. 1210798.3 filed on Jun. 18, 2012, the disclosures of which are incorporated in their entirety by reference herein.

FIELD OF INVENTION

The present invention is concerned with a system for the assembly and disassembly of articles and in particular is concerned with a process for the assembly and disassembly of textile based articles and with equipment and articles for such an assembly and disassembly process.

BACKGROUND ART

The vast majority of textile based products, which have been assembled from multiple components e.g. garments, shoes, furnishings, floor coverings, quilts, mattresses, bedding, automotive airbags, seat covers and safety belts are very difficult to recycle into useful products and/or be reused at the end of their useful or expected life. The majority of these products are either downcycled into low value products or discarded to municipal waste. Some garments, if in satisfactory condition may be suitable for reuse without additional re-manufacture and may be sold via charity shops or exported to developing countries where they are reused.

A common example of recycling is through use of fiber reclamation mills. Textile products may be shredded into fibers and blended with other fibers, depending on the intended end use. The recycled fibres may then be mechanically processed by processes such as carding or air-laying to produce a web, which is then converted into nonwoven fabrics using techniques such as needlepunching, stitch-bonding, thermal bonding, chemical bonding and similar nonwoven bonding techniques. Alternatively, webs containing recycled fibres may be converted via other manufacturing processes in to yarns ready for weaving, knitting and similar fabric production processes. Recycled fibers may be used as components in the production of nonwoven fabrics for use in for example, mattress production (e.g. insulator pads above the springs) and sound insulator pads used in the manufacture of vehicles. Waste textile and clothing may also be shredded to make filling materials for insulation products, roofing materials such as felts, padding materials for furniture manufacture, fillers for composites and many other applications.

Textiles in municipal solid waste largely consist of discarded clothing, although other sources include furniture, mattresses, carpets, footwear, and goods such as sheets, towels, curtaining and other household fabric uses such as furniture. In the US alone it is estimated that eleven million tonnes per annum of textiles end up in landfill and in the United Kingdom it is approximately one million tonnes per annum. Whilst various methods exist for recycling of textile-based products, many garments are difficult to recycle due to the complexity of their structure and the presence of multiple different materials including non-textile materials used in their manufacture.

Whilst the majority of textile-based articles being directed to municipal waste such as landfill have reached the end of their useful life a significant quantity of such textile based articles have not reached the end of their useful life and could be reused or redirected for use elsewhere. Significant quantities of clothing is rejected by retailers and brand owners because of flaws or because it is surplus to requirements or it is out of season/fashion. In addition, although large quantities of donated clothing are collected each year, not all of this clothing is suitable for re-sale or re-use.

Another major area where a significant quantity of reusable textile material is directed to landfill is in the area of corporate clothing and workwear. Many articles of corporate clothing including uniforms cannot be reused because there are potential security issues associated with the corporate identity. At present, identifying insignia or labels cannot be easily or economically removed to reduce the risk of such security issues. The main reason why the bulk of these articles are not reused is because they are difficult and expensive to process for the removal of labels and corporate insignia. Removal of labels and tax tabs prior to reuse is necessary often for security reasons, but is hampered because it often has to be done manually, which is not cost-effective. Also, the underlying fabric may be unavoidably damaged as the logo or insignia is removed. Embroidered logos and insignia are particularly difficult to remove in a cost-effective manner without damaging the base fabric in the process. The complex issues around the recovery and reuse of corporate clothing has recently been addressed in a paper entitled "Principles of the recovery and reuse of corporate clothing", by Russell et al., in Waste and Resource Management, 163, Issue WR4, pages 165 to 173.

Another problem with many textile products is the heterogeneity of the composition and methods that are used to join the integral components, which are irreversible. Many textile products comprise of more than one material, for example, metal zips and fastenings are attached to the fabric. In addition it is common for textile components not to be comprised of homogeneous plastic materials. For example, a 100% cotton product may be sewn together with a sewing thread containing synthetic or man-made polymers such as polyester and the joint requires substantial energy to break. When such products are shredded, these different materials become intermixed and the separation of these individual components becomes very difficult. If an attempt is made to disassemble a conventional textile product in to its separate components by breaking stitches, seams or joints mechanically, substantial energy is required because these joints are not designed to be separated, for the same reason the separation may be incomplete due to tearing of the product due to the force involved resulting in some cross contamination of the material streams. The cost-effective disassembly and separation of the individual components of a textile product at the end of life is therefore problematic.

Recycling processes require effective means of separating textile components so that individual components of the product can be more cost-effectively separated and recycled without contaminating the various components. Examples include, the recycling of furniture, floorcoverings, mattresses, interior automotive components, seating, home furnishings, shoes, and soft luggage.

There is a growing need for safe and effective systems and methods of article assembly and disassembly, especially the assembly and disassembly of textile based articles.

DISCLOSURE OF THE INVENTION

Thus in accordance with the present invention there is provided a system for article material reuse or recycling, which system comprises the assembling of an article from at least two components, at least one of which comprises a textile material brought into communication with each other through one or more connecting means, wherein the assembled article is susceptible to automatic or semi-automatic disassembly through one or more of its connecting means being susceptible to a reduction in one or more mechanical properties under exposure of the article to electromagnetic energy.

The disassembly is facilitated by the reduction in one or more mechanical properties of the one or more connecting means and the disassembly process utilizes this reduction in one or more mechanical properties. In one embodiment one or more of the components of the article from the disassembly may be re-used in the assembly to make the same or similar type of article. In another embodiment the components of the article may be re-used in the assembly of a different type of article from the disassembled article. In another embodiment the components of the article from the disassembly are re-used or recycled via a process that does not require or use the connecting means susceptible to a reduction in one or more mechanical properties under exposure to electromagnetic energy.

The present invention further provides an article susceptible to automatic or semi-automatic disassembly, which comprises at least two components at least one of which comprises a textile material in communication with each other through one or more connecting means, wherein one or more mechanical properties of at least one of the connecting means may be reduced on exposure to electromagnetic energy.

The present invention further provides a method of manufacturing an article susceptible to automatic or semi-automatic disassembly, which method comprises securing at least two or more components at least one of which comprises a textile material to each other via one or more connecting means, wherein at least one of the connecting means is susceptible to a change in one or more of its mechanical properties under exposure to electromagnetic energy.

The present invention further provides a method of disassembly of an article comprising one or more components at least one of which comprises a textile material and one or more connecting means susceptible to a reduction in one or more mechanical properties under exposure to electromagnetic energy, which method comprises exposing the articles to electromagnetic radiation under conditions to achieve a reduction in one or more mechanical properties of one or more of the connecting means such that at least one component may be separated from the article.

The present invention further provides an article disassembly plant comprising at least one region for exposure of articles comprising at least one textile material for disassembly to electromagnetic radiation, means for introducing articles to this exposure region and means for extracting exposed articles from the exposure region.

The present invention further provides connecting means suitable for use in the assembly of an article, wherein the connecting means is susceptible to a reduction in one or more of its mechanical properties under exposure to electromagnetic energy.

The preferred articles of the present invention are articles comprising one or more textile materials. The articles may be exclusively based on textile materials but may also comprise a mixture of textile and non-textile materials. As an example the article may comprise a textile substrate with a non-textile based label secured to the textile substrate. As a further example, the article may comprise a non-textile material, such as a metal button or zip secured to the textile substrate. The article may be in the form of any product that is joined by the use of sewn, stitched, embroidered or stapled threads including garments and other items of clothing (e.g. hats, gloves, shoes, socks, etc) as well as non-clothing items such as badges, labels, seat-covers, seat furnishings, car headliners, mattress covers and tickings, bedding including pillows and duvets, sheets, parachutes, airbags, seat belts, composites, medical, healthcare, composite and industrial products. The present invention is especially useful in the disassembly of garments and other products whose assembly involves stitching or sewing. Garments meaning any form of human attire, preferably comprising one or more textile components. It is envisaged that non-textile based articles may used in the present invention, especially when the components of the articles are secured to each other by means of a filament, staple, yarn or thread. Preferably the form of the communication between article components is a join such as a seam, embroidery, or sewn, stitched or stapled joints.

In accordance with the present invention the connecting means may be in any form suitable for use in the assembly of the article. When the article comprises a textile component it is preferred that one or more of the connecting means is in the form of at least one filament, yarn or staple or a combination of these connecting means.

The filament, staple or yarn may be manufactured from any material that is susceptible to a reduction in one or more of its mechanical properties under exposure to electromagnetic energy. It is preferred that the material is such that upon exposure to electromagnetic energy there is a significant reduction in the physical integrity of the material such that the connector comprising the material may be disintegrated under relatively low applied force. The level of disintegration of the connector may be such that when the article is simply moved or handled after exposure the e.g. by hand, relevant component or components are separated from the article. In one embodiment disintegration is induced by a mechanically applied force to the connector and/or the components of the article. In a preferred embodiment the material properties of the connector are such that one or more mechanical properties of the connector is degraded to such a degree that disintegration occurs on exposure to the electromagnetic energy, with no need for an applied force to disintegrate the connector after exposure.

In a preferred embodiment the material of the connection means is such that on exposure to electromagnetic energy there is a rise in temperature of the material. It is preferred that it is the rise in material temperature on exposure, which results in the reduction in the mechanical properties of the material.

The electromagnetic energy may be any electromagnetic radiation, which may induce a reduction in the mechanical properties of one or more of the materials of the connection means. It is preferred that the electromagnetic radiation is in the radio frequency range or the microwave frequency range and most preferably the microwave frequency range.

The frequency of the emitted electromagnetic radiation may be in the range of 3 Hz to 300 EHz, most preferably in the range of 300 MHz to 300 GHz In the context of the present invention the term "microwaves" refers to electromagnetic radiation in the frequency range from 300 to 30,000 MHz (megahertz) and more preferably from 800 to 4,000 MHz The microwave radiation may interact with a material in a number of ways. These may be referred to as resistive heating or dielectric heating.

With a material that is a conductor, electrons move freely in the material in response to an electric field and electric current results. Unless the material is a superconductor, the flow of electrons will heat the material through resistive heating (Joule heating). This relationship is described by Joules law:

$$q = I^2 \cdot R \cdot t$$

Where: q is the heat liberated
I is current flowing through a material
R is the resistance of the material
t is time Microwave induced electric currents in such materials results in resistive heating of the material.

Dielectric heating is the phenomenon, which can be experienced when, microwaves act upon an insulator; electrons do not flow freely, but re-orientation or distortions of induced, or permanent dipoles, can give rise to heating. Microwaves penetrate such materials and release their energy in the form of heat as the polar molecules (ones with positively and negatively charged ends—such as water) vibrate at high frequency to align themselves with the frequency of the microwave field. The microwaves interact directly with the object being heated. The interaction is related to the chemical properties of the material and it is possible to apply heat in ways that cannot be achieved by conventional means (convection heating, conductive heating or radiant heating).

It is therefore preferred that the connecting means comprise one or more materials that are susceptible to resistive or dielectric heating or a combination of these under exposure to microwave radiation and this results in the reduction in one or more of their mechanical properties.

It is preferred that the connection means materials on exposure to the electromagnetic radiation exhibit the desired reduction in one or more mechanical properties at a material temperature, which is below a temperature which would impart thermal damage to the components of the article. In this regard it has been found that certain connection means manufactured exclusively from metals that melt at a high temperature e.g. steel are not suitable as connector materials for most textile articles. This is because for many articles when steel is used it disintegrates at a temperature, which causes thermal damage to the article for disassembly.

The one or more connecting means susceptible to a reduction in one or more mechanical properties under exposure to electromagnetic energy may comprise two or more materials. The connecting means may comprise two or more materials as separate regions or layers or components of the connecting means with one or more of the connecting means components being susceptible to a reduction in one or more mechanical properties under exposure to electromagnetic radiation. Thus in one embodiment it is envisaged that the connecting means may comprise two components each of a different material, one being susceptible to being heated on exposure to electromagnetic radiation and the second being relatively unaffected by such exposure. In this embodiment the disintegration of the connecting means may be due to the mechanical degradation of one of its components resulting in disengagement of the components from each other. In another mode the disintegration may be due to the mechanical degradation of the component relatively unaffected by exposure to electromagnetic through heat transfer from the component heated on exposure to the electromagnetic radiation. It is possible that both the preceding modes of disintegration may occur.

In a preferred embodiment the filament, staple, or yarn connection means comprises a bi-component material wherein the electromagnetic radiation susceptible material is present in one or more of the constituent components.

In a preferred embodiment the connection means comprises one or more organic polymeric components (natural or synthetic) and a material that may be heated rapidly on exposure to electromagnetic radiation such that one or more mechanical properties of the connection means may be rapidly degraded by exposure of the connection means to electromagnetic energy.

The structure/form of the filament staple or yarn may take on a number of suitable forms.

The structure/form of the filament staple or yarn may comprise one or more organic materials coated and/or chemically bonded with one or more electromagnetic radiation susceptible or conductive additives or materials, which on exposure to electromagnetic radiation transfer heat to the organic materials degrading their mechanical properties.

The structure/form of the filament staple or yarn may comprise one or more organic materials chemically bonded with one or more electromagnetic susceptible or conductive materials, which on exposure to electromagnetic radiation transfer heat to the organic materials degrading their mechanical properties.

The structure/form of the filament staple or yarn may comprise a core/sheath structure with at least the sheath material comprising one or more materials susceptible to electromagnetic radiation, which on exposure to electromagnetic radiation transfer heat to the organic core materials degrading their mechanical properties.

The structure/form of the filament staple or yarn may comprise a core/sheath structure with at least the core material comprising one or more materials susceptible to electromagnetic radiation, which on exposure to electromagnetic radiation transfer heat to the organic sheath materials degrading their mechanical properties.

In a preferred embodiment the connection means comprises a plied yarn construction comprising at least one filament yarn susceptible to exposure to electromagnetic radiation, wherein the yarn is comprised of two or more filaments or combinations of filament and staple yarns. These include plied yarns comprising filaments containing at least one metallic compound (other than steel). Also envisaged are blended yarns containing a core of at least one filament or staple fibre yarn that is susceptible to exposure to electromagnetic radiation sheathed by organic fibres, or yarn mixtures containing any combination of the above described yarn related embodiments. This may take the form of a twisted yarn assembly containing at least one filament or yarn that it susceptible to exposure to electromagnetic radiation with one or more additional filaments or yarns wrapped or twisted around it so as it to cover it. The additional covering filament/s can be comprised of man-made or natural polymers that may be dyed or pigmented. Alternatively, the additional covering filament/s pre-dyed or pigmented so as to permit a range of different colours to be achieved without the need to dye or pigment the filament or yarn that it is susceptible to electromagnetic radiation.

In a preferred embodiment, the yarn containing at least one filament or yarn that it susceptible to exposure to electromagnetic radiation is covered (or sheathed) with staple fibre (e.g. cotton, viscose, lyocell, polyester, polypropylene, polyamide) so as to hide the core component. This is done by existing processes that are known in the art, for example, core-spinning, ring spinning, air-jet spinning or friction spinning. It has been found that such an arrangement facilitates the production of yarns that are compatible with high speed sewing or embroidery operations as well as providing a means of modifying the colour and appearance of the yarn. In a preferred embodiment the cover yarn has a yarn linear density of 50 dtex or more. Preferably the cover yarn is twisted in both the S-direction and Z-direction to produce a double-covered yarn assembly of balanced twist. By twisting two or more additional yarns around the yarn core, the core is mechanically protected from subsequent abrasion. Furthermore the core is also substantially hidden from view. The colour, handle, appearance, softness and general aesthetics of the final yarn is then principally dependent on the yarns twisted around the core. As a result of covering the core with yarns containing cotton, the resulting yarn surface may be soft and hydrophilic as well as being suitable for yarn colouration or chemical finishing. A particularly suitable construction for sewing thread use was produced by twisting at least two additional yarns composed of cotton around a "core" multifilament yarn or staple fibre yarn with a specific resistivity of $10^{-2}$-$10^0$ $\Omega Q^*cm$. The "core" multifilament or staple fibre yarn is composed of acrylic or polyamide fibre wherein the fibres and filament contain a chemically bonded layer of copper sulphide that is proximal to the fibre/filament surface. The copper sulphide layer is of the order of 300-1000 Å (angstroms) thick. It was determined that the "core" can comprise of a Thunderon™ polyamide multifilament yarn containing a layer of copper sulphide (sulfide). This "core" yarn could be hidden by the two or more yarns twisted around it. A particularly suitable grade of core material was Thunderon™ 110 dtex/24 F.

The components of the connecting means may comprise one or more of the following materials: metal sulphides e.g. copper sulphide/sulfide including digenite ($Cu_9S_5$), covellite, anilite, djurleite, chalcocite; various mixed valent oxides, such as magnetite, nickel oxide and the like; sulfide semiconductors, such as $FeS_2$ and $CuFeS_2$; silicon carbide; various metal powders such as powders of aluminum, iron and the like; various hydrated salts and other salts, such as calcium chloride dihydrate; aliphatic polyesters (e.g., polybutylene succinate and poly(butylene succinate-co-adipate), aromatic polyesters, polymers and copolymers of polylactic acid; various hygroscopic or water absorbing materials or more generally polymers or copolymers with many sites of OH groups. Examples of other suitable inorganic materials include, without limitation, aluminum hydroxide, zinc oxide, barium titanate. Examples of other suitable organic materials include, without limitation, polymers containing ester, aldehyde ketone, isocyanate, phenol, nitrile, carboxyl, vinylidene chloride, ethylene oxide, methylene oxide, epoxy, amine groups, polypyrroles, polyanilines, polyalkylthiophenes. Examples of other additives include, without limitation, the following: metallic particles such as aluminium, copper, gold, tin, zinc particles; metallic oxide particles such as barium dodecairon nonadecaoxide, diiron nickel tetra-oxide, manganese di-iron oxide, zinc diiron oxide, titanium carbide, silicon carbide, zinc oxide; and galvanic couple alloy particles, such as, aluminium-nickel alloy, aluminium-cobalt alloy and aluminium-copper alloy particles. It is preferred that the components do not comprise a carbon, carbon black or graphite core.

In a particularly preferred embodiment one or more of the connecting components comprises at least one component that is comprised of an organic material containing a metal sulphide, most preferably copper sulphide. Preferably at least one component comprises an acrylic, polyamide or polyester containing a metal sulphide, preferably copper sulphide material. A particularly preferred embodiment uses Thunderon® filament or staple fibre yarn comprised of an acrylic or polyamide material chemically bonded with a layer of copper sulphide wherein the thickness of its conductive layer is 300-1000 Å (angstroms) and the filament or yarn specific resistance is within the range $10^{-3}$-$10^0$ $\Omega \cdot cm$.

It is preferred that the connecting means comprises one or more materials having a specific resistance within the range of $10^{-5}$-$10^{11}$ $\Omega \cdot cm$., more preferably $10^{-5}$-$10^5$ $\Omega \cdot cm$., more preferably $10^{-5}$-$10^0$ $\Omega \cdot cm$., more preferably $10^{-4}$-$10^0$ $\Omega \cdot cm$., and most preferably $10^{-3}$-$10^0$ $\Omega \cdot cm$. Pseudo-conductive materials are preferred to reduce the potential for overheating and damage to the surrounding textile fabric whilst at the same time providing sufficient heating to deteriorate mechanical properties. Thus it is preferred that in the present invention connecting means with a resistivity of less than $10^{-3}$ $\Omega \cdot cm$ are selected, which are not metals or metal containing. It is also preferred that in the present invention connecting means with a resistivity of greater than $10^0$ $\Omega \cdot cm$ are selected, which exclude elemental carbon and/or carbon black and/or graphite.

The connecting means may comprise a flexible joint or seam comprising one or more yarns in the form of one or more stitch classes (suitable stitch constructions are detailed in ISO 4915: 100's, 200's, 300's, 400's, 500's and 600's stitch classes); these are the preferred examples of a bi-component connection means. Such stitch classes, without limitation, may include: 100 single thread chain stitch; 300 lock stitch; 400 multi-thread chain stitch; 500 over edge chain stitch; 600 covering chain stitches; or any combination of two or more of these stitch classes. The yarn may be used as, needle thread, bobbin thread, looper thread or any combination of these. According to the stitch class, to ensure joint failure following the exposure of the joint to electromagnetic radiation, it may be particularly advantageous to incorporate the thread susceptible to a reduction of its mechanical properties only as a bobbin thread of the bi-component stitch since the tensile strength requirements are frequently less critical for the bobbin component than for the needle-thread component where higher processing forces are encountered during manufacture of the joint. Microwave-induced failure of the lower thread component in the joint (delivered by the bobbin thread) is then the controlling factor in the mechanical failure of the bi-component joint, facilitating separation of the upper and lower components of the connection means and thus separation of the article components secured by the bi-component joint. This approach also minimizes the economic cost of the joint, since the microwave-sensitive yarn component is only required in part of the entire joint construction.

It is preferred that the mechanical property reduced on exposure to microwave and resistive or dielectric heating or a combination thereof is the tensile strength of one or more of the materials comprising the connecting means. The loss of tensile strength in one or more of the materials comprising the connection means enables that component of the connection means to fail resulting in loss of strength of the connection means and its consequential structural failure allowing disassembly to be achieved. The total reduction in tensile strength (breaking load) that is achieved as a result of microwave heating has been found to increase as the overall yarn or filament linear density (tex=weight in g of 1000 m of yarn) decreases.

When the connection means is a stitch based joint between two textile components of an article it is preferred that compromising of the mechanical properties of one or more of the components of the joint results in a joint strength reduction of at least 50%, more preferably at least 80% and most preferably at least 90%.

It is preferred that the reduction in the mechanical properties of one or more of the materials of the connection means is sufficient to enable disassembly of the article comprising the connection means using an applied force of 20 N or less, more preferably 15 N or less and most preferably 10 N or less. This may be tested according to standard test methods, e.g. EN ISO 13934-2; 1999 Grab method for Tensile Strength, EN ISO 13935-1; 1999 method for Seam Strength Strip and EN ISO 13935-2; 1999 method for Seam Strength Grab method.

In a preferred embodiment the connection means is selected from materials that exhibit the required reduction in mechanical properties when exposed to a microwave power density of 0.060 w/cm$^{-3}$ or less, more preferably 0.050 w/cm$^{-3}$ or less, more preferably 0.047 w/cm$^{-3}$ or less, more preferably 0.040 w/cm$^{-3}$ or less, more preferably less than 0.040 w/cm$^{-3}$, and most preferably within the range of 0.001 w/cm$^{-3}$ and 0.04 w/cm$^{-3}$. It has surprisingly been found that at such low power densities enough energy may be imparted to facilitate disassembly. This is the case when the one or more connecting means constitute less than 5% by weight, preferably less than 3% by weight, more preferably 2% or less by weight and most preferably between 0.5 to 2% by weight of the total article being disassembled.

The article disassembly plant of the present invention comprises at least one region for exposure of articles for disassembly to electromagnetic radiation, means for introducing articles to this exposure region and means for extracting exposed articles from the exposure region and is designed to ensure that a requisite and effective dose of electromagnetic radiation is delivered to articles for disassembly passing through the plant. The plant equipment is designed to enable the safe application of electromagnetic radiation to articles especially textile based articles.

In a preferred embodiment the equipment for exposure primarily comprises a chamber or cavity designed to contain electromagnetic radiation during exposure of the articles for disassembly. In the case of microwave irradiation the chamber is designed through appropriate screening design to ensure that microwave radiation is contained within the chamber and is unable to escape from the chamber and become potentially hazardous to operators of the plant. The equipment also comprises one or more electromagnetic field generators, preferably microwave field generators and associated control electronics under computer and appropriate software control. In addition the equipment may comprise opening doors to access the chamber interior and a system to transport articles into and/or through the chamber. The microwave field generators may be low power preferably 2 kW or less and more preferably 1 kW or less.

The chamber of the equipment is of sufficient volume to accommodate the required mass of one or more textile items. The required mass is governed in part by the power setting of the equipment, which is tailored to ensure that the required dose of radiation is imparted to the articles in the chamber to enable disassembly.

The articles for disassembly may be processed through the equipment singularly or in multiples, in bales or in rigid tote bins, flexible bags or other types of container compatible with the electromagnetic i.e. microwave environment. The process may take place in batch, semi-continuous or continuous operation. Preferably, the chamber, which may be an aluminium chamber, features an inner box liner, preferably polymeric in nature e.g. manufactured from polyurethane and sized to accept a particular tote bin pre-existing in the supply chain. The liner separates the working volume of the equipment from the associated technical workings of the chamber, specifically such workings as the mode stirrer and the three microwave apertures. This feature prevents accidental damage occurring to the mode stirrer or the microwave wave guides, as well as preventing dust contamination within the wave guides/microwave apparatus and simplifying general cleaning.

In a preferred embodiment the article or articles for disassembly contain relatively low levels of moisture before exposure to the electromagnetic radiation e.g. microwave radiation in the disassembly inducing phase of the process. Preferably the article or articles have a total moisture level of 0.1 to 25% by weight of the total weight of articles for disassembly, more preferably 0.1 to 15% by weight of the total weight, more preferably 0.1 to 10% by weight of the total weight, more preferably 0.1 to 5% by weight of the total weight, more preferably 0.1 to 2% by weight of the total weight, more preferably 0.2 to 2% by weight of the total and most preferably 0.4 to 2% by weight of the total weight. Thus in a preferred embodiment the plant or apparatus for implementing the process/system of the present invention further comprises a stage/unit before the exposure region/chamber, which reduces the moisture content of the articles or articles to the desired level for exposure to the radiation. This moisture reduction may be effected by any suitable means of moisture reduction that does not damage the components of the articles. In one embodiment the moisture reduction may be effected in the radiation exposure region or chamber prior to exposure to the radiation. The apparatus of the present invention preferably comprises means for detecting and monitoring the moisture level of the articles for disassembly, means of setting and controlling the moisture reduction stage to achieve the desired moisture level and means for controlling the radiation exposure conditions to effect reduction in the one or more material properties of the connecting means in the articles to be disassembled.

The openings to the chamber may feature doors to fully seal the opening during the electromagnetic field operation; these doors may be manual, semi-automatic or fully automatic in operation. The physical configuration of these doors and the sequence of their operation may be designed as to allow batch, semi-continuous or continuous operation. In a preferred embodiment on the inner face of the door there is mounted a choke seal to prevent any leakage of microwave fields when the door is closed. To make the choke seal effective while still allowing easy and rapid manual opening and closing of the door, the door is preferably held tightly closed by means of pneumatically actuated clamps, acting across the top and bottom edges of the door. The clamps are automatically activated when the door is pushed closed, as this action engages a pair of safety interlocks, one mounted either end of the door; receiving the engaged signal from both interlocks informs the control system to close the clamps.

The openings may take the form of an aperture, permanently open but of such a design as to prevent the egress of electromagnetic i.e. microwave radiation during operation of the equipment. Such an arrangement lends itself to a continuous mode of operation of the equipment. The articles may be transferred and transported through the chamber in a continuous manner, a conveyor belt being one method of achieving this.

The articles may be transported through the chamber by means of manual handling, electrically or mechanically-driven flat bed conveyor belt, vibratory conveyor, suspended from a pulley or chain, mechanically pushed or pulled, gravity fed with a suitable incline, suction or pressure, etc.

The articles may be stationary or in motion (either rotational or longitudinal) during exposure to the electromagnetic radiation.

The equipment may incorporate one or more individual electromagnetic radiation sources i.e. microwave sources directing radiation fields into a single chamber through one or more individual ports in the walls of the chamber. Preferably each electromagnetic radiation source comprises a microwave generator sub-assembly comprising an air-cooled magnetron, an electric cooling fan mounted in close proximity to the magnetron, a length of wave guide connecting to the magnetron outlet at one end and featuring a mounting flange at the other, the flange being used to bolt the subassembly to the corresponding flange on the side of the chamber. Also part of the assembly there may be included a circuit board for the local control functions and high voltage connections to the magnetron. Each sub-assembly may be protected in situ by a perforated stainless steel safety cover, this preventing any accidental contact with hot or high voltage elements while still allowing sufficient passage of cooling air around the electrical components. The wave guide exits into the chamber may be positioned in one or more of the side, top or bottom walls of the chamber. In a preferred embodiment the electromagnetic radiation sources and the associated wave guides are arranged such that the electric field direction of the wave guide exits are perpendicular to one another.

The equipment may also incorporate a mode stirrer. Preferably, this is mounted on the base of the equipment beneath the chamber, its function being to disrupt any standing waves occurring in the chamber by varying the effective internal height of the chamber as the paddle rotates. The mode stirrer paddle is mounted between the chamber's aluminium outface and the inner polyurethane liner. The mode stirrer is ideally driven by an electric motor and gearbox assembly mounted on the outside of the chamber. The mode stirrer preferably rotates sufficiently to move high field areas by more than a quarter wavelength. Preferably this is achieved by a rotating mode stirrer where the movement during the equipment operating cycle is at least $\pi/2$ radians. The diameter of the mode stirrer is preferably more than 5% of the length of the shortest side of the base of the microwave chamber.

The microwave sources preferably impart a power density to the chamber of 0.060 w/cm$^{-3}$ or less, more preferably 0.050 w/cm$^{-3}$ or less, more preferably 0.047 w/cm$^{-3}$ or less, more preferably 0.040 w/cm$^{-3}$ or less, more preferably less than 0.040 w/cm$^{-3}$, and most preferably within the range of 0.001 w/cm$^{-3}$ and 0.04 w/cm$^{-3}$.

The electromagnetic radiation sources may operate either individually in sequence, with one or more operating in parallel or a combination of these states.

It is preferred that the apparatus control systems operate to deliver an electromagnetic radiation i.e. microwave exposure time of between 0.5 and 1000 seconds, more preferably 0.5 and 700 seconds, more preferably, 0.5 and 500 seconds, more preferably 0.5 and 400 seconds and most preferably 0.5 and 300 seconds.

The preferred operating temperature within the chamber of the apparatus is within the range of −25° C. to 120° C., and most preferably −18° C. and 100° C.

BRIEF DESCRIPTION OF THE DRAWINGS

The present invention is exemplified and may be further understood upon reference to the following detailed description when read in conjunction with the accompanying drawing, wherein like reference characters refer to like parts throughout the several views, and in which.

DETAILED DESCRIPTION

Figure 1:
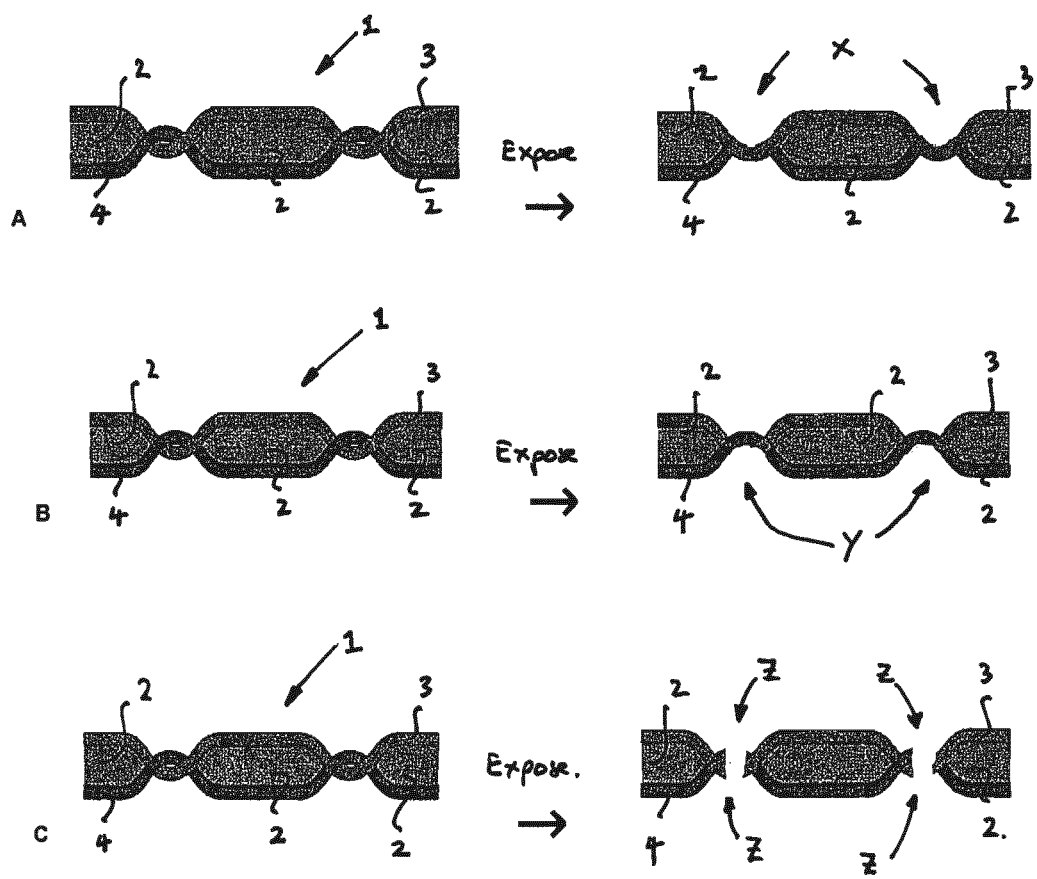
FIG. 1 A to C are schematic views of various connection means according to the invention before and after exposure to microwave radiation.
Figure 2:
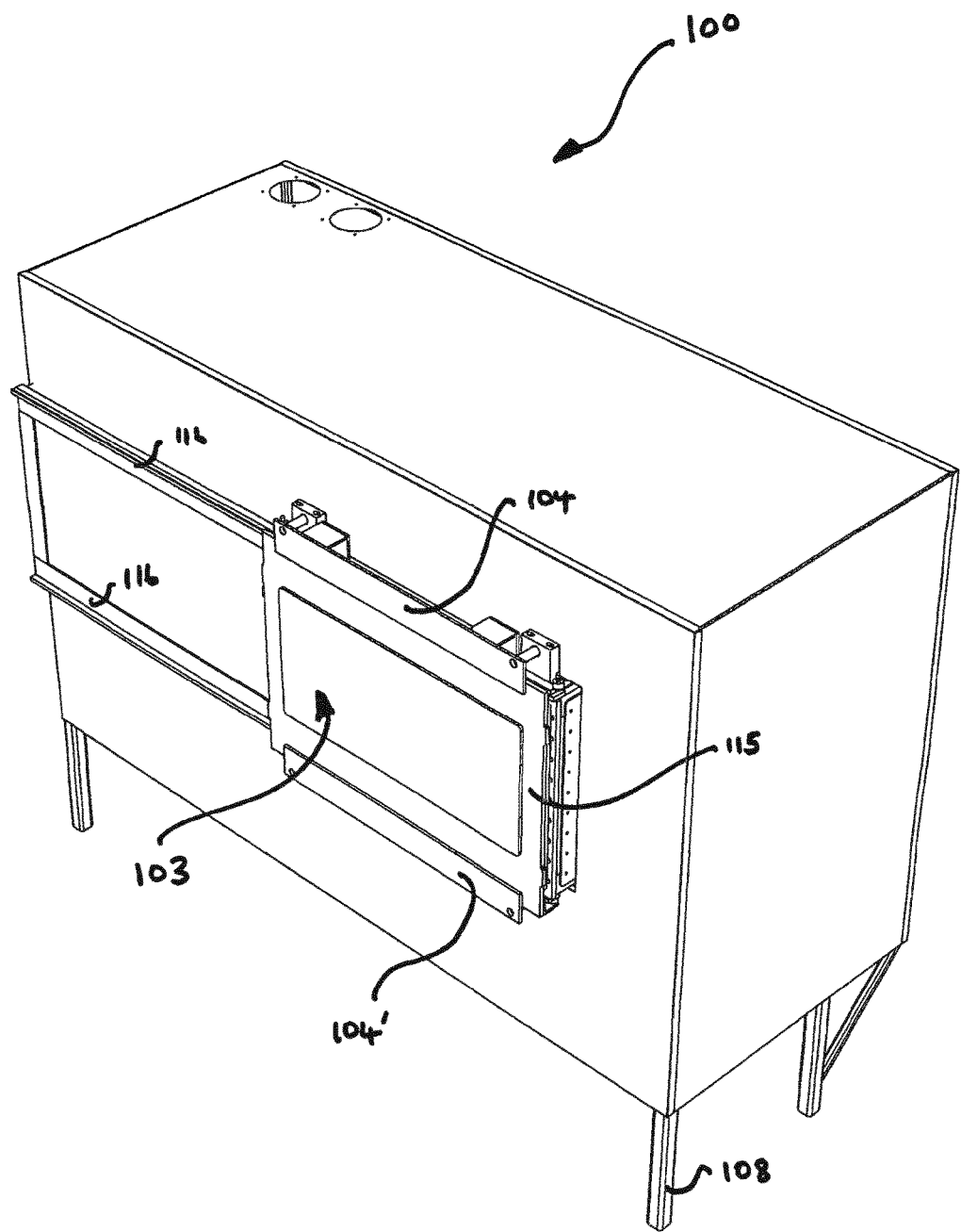
FIG. 2 is a perspective view of an exposure apparatus according to the invention.
Figure 3:
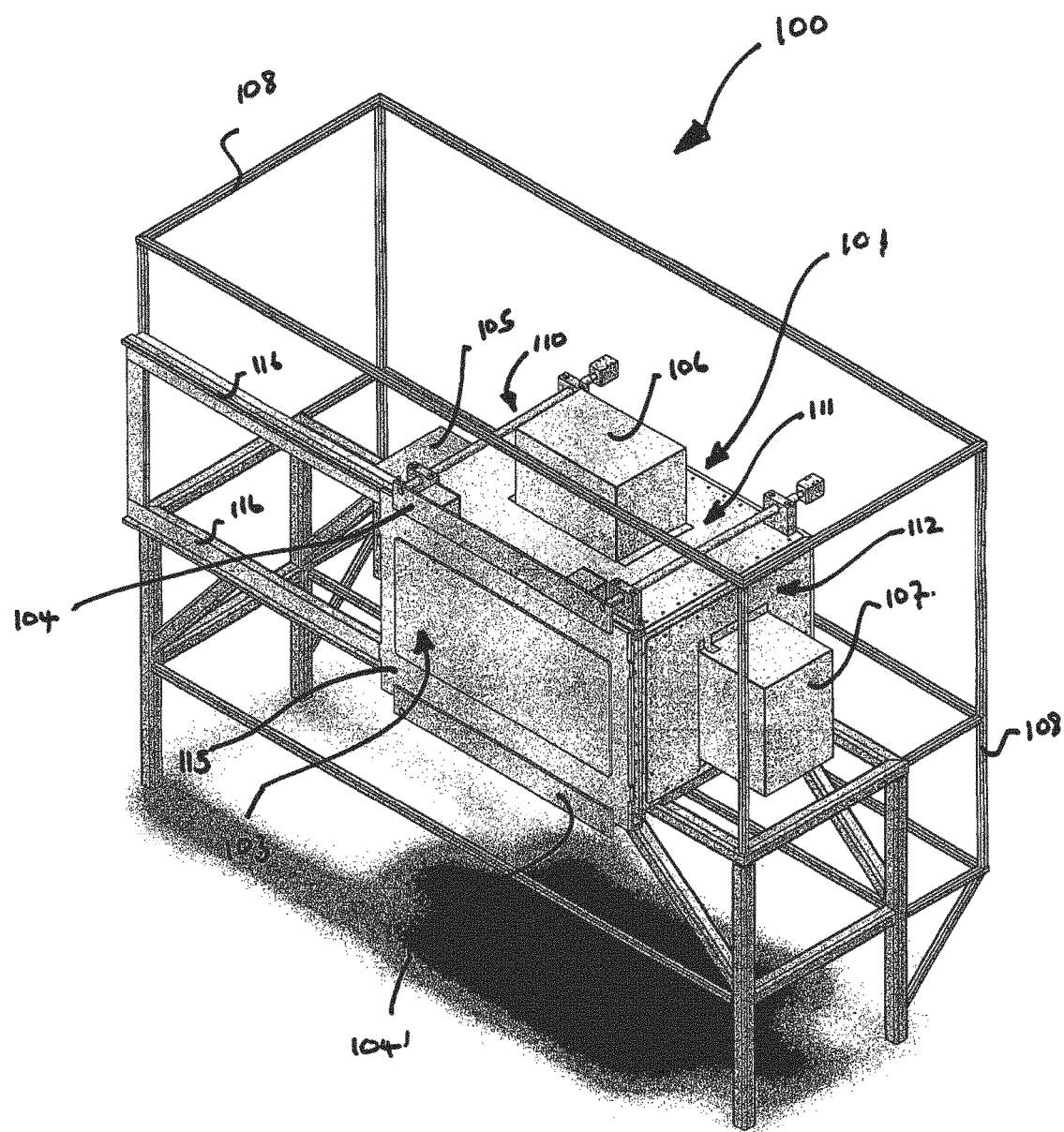
FIG. 3 is a perspective view of an exposure apparatus according to the invention as illustrated in FIG. 1 with exterior panels removed.
Figure 4:
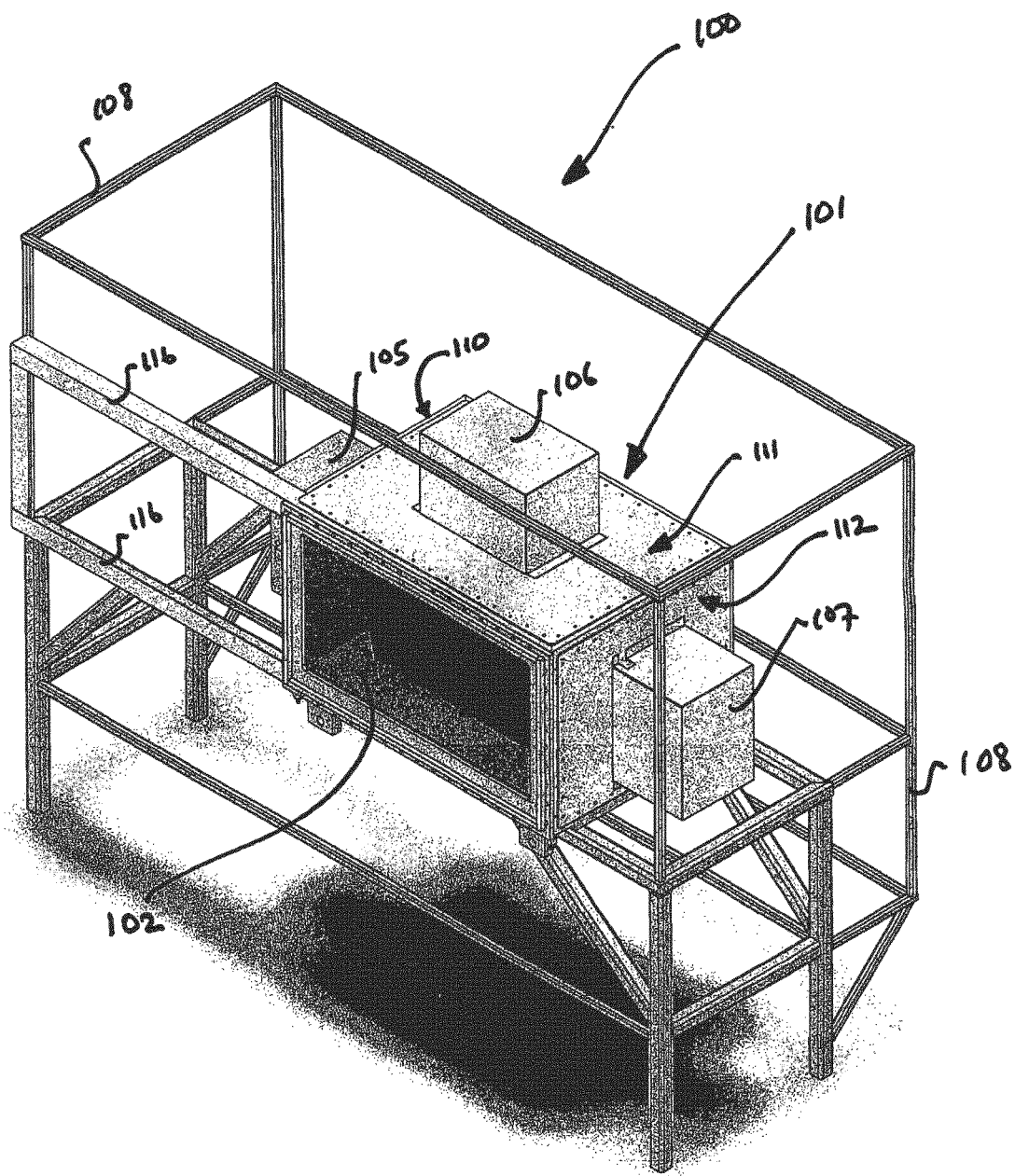
FIG. 4 is a perspective view of an exposure apparatus according to the invention as illustrated in FIG. 2 with the chamber door removed.
Figure 5:
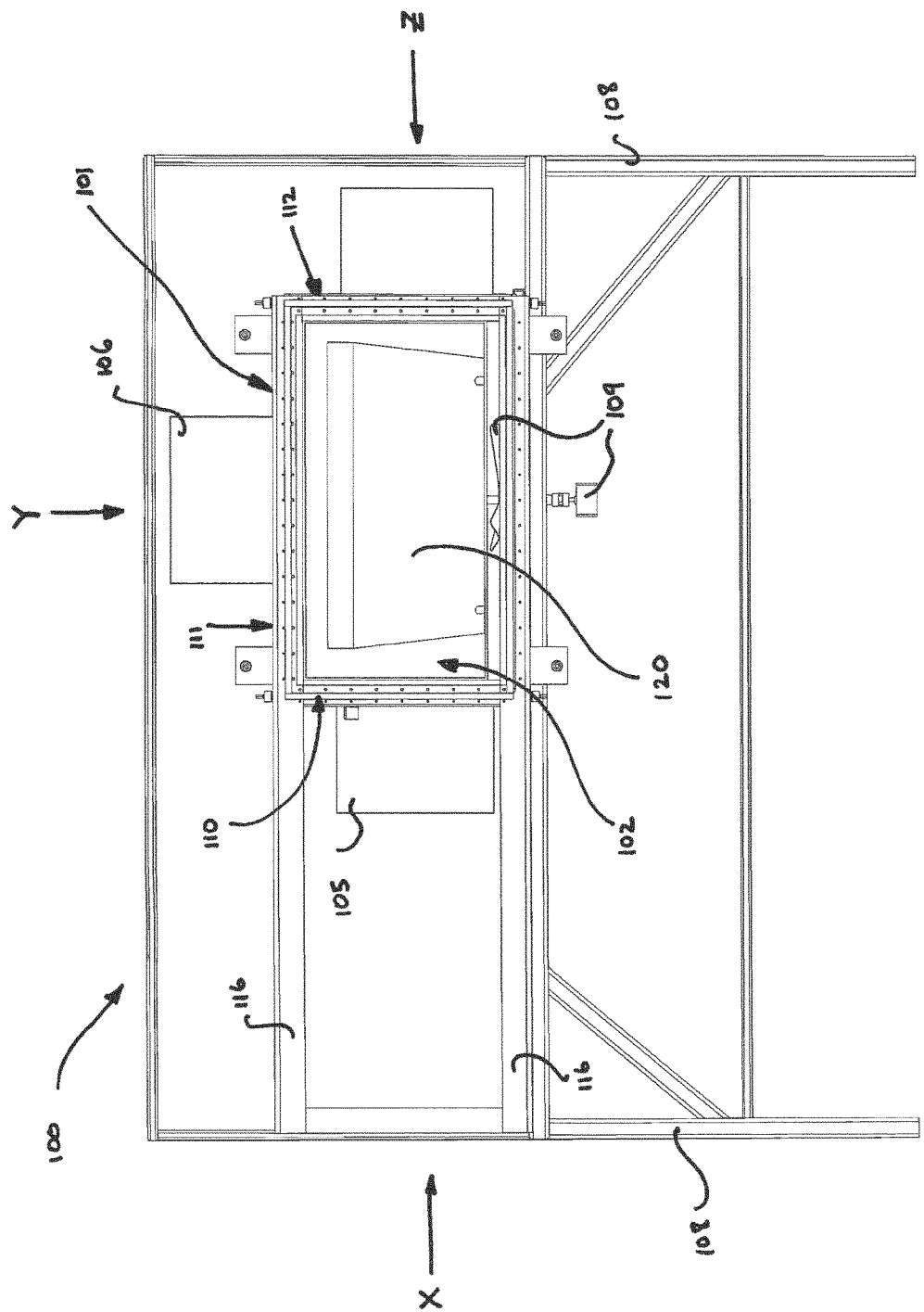
FIG. 5 is a front view of the exposure apparatus according to the invention as illustrated in FIG. 4 with the chamber door removed.
Figure 6:
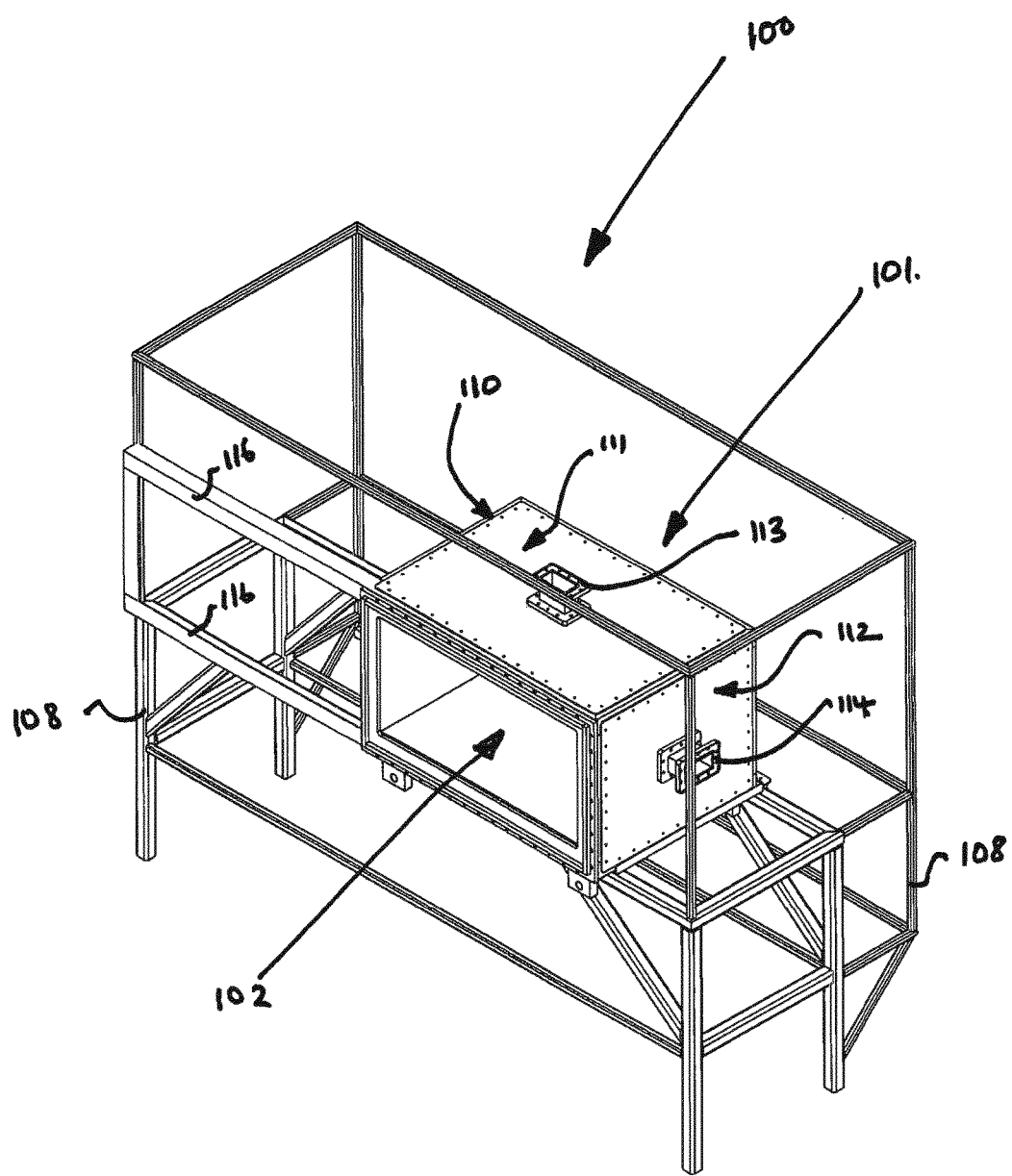
FIG. 6 is a perspective view of an exposure apparatus according to the invention as illustrated in FIG. 4 with microwave housings removed.

With reference to FIGS. 1 A-C, various modes of disassembly are illustrated for one embodiment of the invention. In FIG. 1A there is illustrated a textile based article (1) comprising textile fabric (2) and a lockstitch with a locking thread (3) and a bobbin thread (4). The lockstitch is a connection means according to the invention, which is connecting two textile cloth components although only one is illustrated in the Figure. In this figure the bobbin thread (4) is susceptible to microwave-induced mechanical degradation, whilst the locking thread (3) is not susceptible or as susceptible to microwave irradiation. On exposure to microwave radiation the bobbin thread (4) is degraded by the microwave and the tensile strength of the bobbin thread (4) is reduced. This reduction in tensile strength of the bobbin thread (4) results in its failure at or near to 'X' when a force is applied to the joined components of the article (1). The locking thread (3) remains intact in this embodiment.

In FIG. 1 B there is illustrated a textile based article (1) comprising textile fabric (2) and a lockstitch with a locking thread (3) and a bobbin thread (4). The lockstitch is a connection means according to the invention, which is connecting two textile fabric components although only one is illustrated in the Figure. In this figure the locking thread (3) is susceptible to microwave irradiation, whilst the bobbin thread (4) is not susceptible or as susceptible to microwave irradiation. On exposure to microwave radiation the locking thread (3) is heated by the microwave and the tensile strength of the locking thread (3) is reduced. This reduction in tensile strength of the locking thread (3) results in its failure at or near to 'Y' when a force is applied to the joined components of the article (1). The bobbin thread (4) remains intact in this embodiment.

In FIG. 1 C there is illustrated a textile based article (1) comprising textile cloth (2) and a lockstitch with a locking thread (3) and a bobbin thread (4). The lockstitch is a connection means according to the invention, which is connecting two textile cloth components although only one is illustrated in the Figure. In this figure the locking thread (3) and the bobbin thread (4) are both susceptible to microwave irradiation. On exposure to microwave radiation both threads (3, 4) are heated by the microwave and the tensile strength of both threads (3, 4) are reduced. This reduction in tensile strength of the threads results in their failure at or near to 'Z' when a force is applied to the joined components of the article (1).

FIG. 1 C also illustrates what may happen when either of the threads are susceptible to microwave radiation and are heated on exposure to microwave radiation. Here the other thread is not susceptible or as susceptible to microwave radiation. Both threads have point contact with each other on the stitch environment. The temperature of the susceptible thread on exposure is such that this heat is also transferred to the microwave resistant thread, which is thermally sensitive and its physical structure is compromised along with that of the susceptible thread.

In a further embodiment the susceptible thread remains intact and the joint fails through heat transfer from this thread to the thread which is not susceptible and the failure will look schematically similar to that illustrated in FIGS. 1 A and B.

With reference to FIGS. 2 to 6 an apparatus (100) according to the invention is illustrated comprising three mains assemblies. The first being the exposure unit (101) having a microwave chamber (102), with associated sub-assemblies of; sliding door (103); door clamping mechanisms (top and bottom) (104, 104'); microwave generators (105, 106, 107); microwave mode stirrer (109). The second being an electrical control and power cabinet (not shown), with associated remote operator control panel. The third being a frame (108), onto which the microwave chamber (102) and electrical control and power cabinet are mounted. The frame (108) features; locking castors (not shown) for ease of movement on site; and safety panels to prevent accidental contact with moving or live electrical components.

The microwave chamber (102) consists of an aluminium box, which is closed on five faces, with the open side being the means to place articles within the chamber (102). The chamber (102) is designed to prevent the leakage of microwave radiation during operation; there are no gaps at the edges of the faces. Located within the chamber (102) is an inner box liner (120) manufactured from polyurethane.

On three of the closed chamber faces (specifically both ends and the top face (110, 111, 112)) there is a rectangular aperture (only two illustrated 113, 114) and corresponding flange onto which is bolted a microwave generator sub-assembly (not shown). The two opposing apertures are orientated with the $2^{nd}$ aperture rotated 90 degrees compared to the first, to introduce microwaves oscillating in both the X and Z-axis. The top mounted sub-assembly (112, 114) provides microwaves in the Y-axis, ensuring that the articles in the chamber (102) are fully immersed in the microwave field, irrespective of their position within the chamber (102).

The chamber (102) is sealed by a sliding door assembly (103). The aluminium plate door (115) is mounted on runners (116), running across the top and bottom front edges of the chamber. Roller bearing assemblies (not shown) on the top and bottom edges of the door locate in tracks machined into the runners. Bump stops (not shown) at both extremities of the travel control the range of door movement.

Mounted on the inner face of the door is a choke seal (not shown) to prevent any leakage of microwave fields when the door (115) is closed.

The exposure process for treatment of garments to facilitate garment disassembly, can be either continuous or batch. In the former method, the assembled articles pass through an electromagnetic field (preferably a microwave field), by means of a conveyor system. The speed should be adjustable to ensure that the product will exit the field within 0.5 and 1000 seconds, preferably within 0.5 and 700 seconds, more preferably within 0.5 and 500 seconds, more preferably 0.5 and 400 seconds and most preferably within 0.5 and 300 seconds. The actuator should be designed accordingly to ensure that the size of the gap between the conveyor belt and the actuator has sufficient size for the products to pass through to the electromagnetic field, while, ensuring that there is no radiation leak that could affect personnel's health and safety. In the latter method, the actuator will have a door that can be opened manually. The products will be placed in a basket and then to the actuator. The actuator will be activated only when the door is closed and for similar time length as mentioned above. Following this process, the door will be opened and the basket containing the disassembled products will be removed.

EXAMPLES

Example 1

Various samples of embroidered logos, sewing yarns and backing fabric were obtained from Mathias & Sons Ltd. A yarn blend of Kevlar®/Acrylic and 50 micron steel wire (Dualtec® AISI 304L) was supplied by Saveguard Ltd, UK. Various article arrangements were prepared with this yarn and other yarns and the samples were subsequently exposed to microwave radiation in a microwave oven, (model Cookworks MM717CKA 700 Watt). The samples and conditions are as follows:

a) Metallic yarn, Dualtec AISI 304L was passed through an embroidered logo from rear side using hand stitching needle. The sample was exposed to microwaves for 10-20 seconds.

b) Fabric sample sewn using a lockstitch with Dualtec AISI304L50 (incorporates 50 µm diameter steel yarn) as the understitch and 100% PET sewing yarn as the upper thread. This sample was exposed to microwaves for 5 seconds.

c) Backing fabric lock stitched using Dualtec AISI304L50 as the understitch and 100% PET sewing yarn as upper thread. This sample was treated with microwaves for 5 seconds.

d) Embroidery was performed using metallic yarn as bobbin thread and viscose sewing thread as embroidery thread. The sample was exposed to microwave for 5-10 seconds.

e) Embroidery was performed using metallic yarn as bobbin thread and polyester sewing thread as embroidery thread. The sample was exposed to microwave for 5-10 seconds.

In all of the samples a) to e) the stitched joint or embroidery failed on exposure of the article to microwaves, however the components or the articles suffered severe heat damage and discoloration from the exposure due to the decomposing metal based yarn. These article components were unsuitable for reuse due to this damage.

Example 2

A commercially available yarn, Thunderon®, (Nihon Sanmo Dyeing Co., Ltd), was used to form a stitch based connection means for various textile based articles. Thunderon® is an acrylic or polyamide fibre or filament that contains a chemically bonded layer of copper sulphide. The fibre diameter is ~4 µm, the thickness of its conductive layer is 300-1000 Å (angstroms) and it has a specific resistivity of $10^{-2}$-$10^0$ Ω·cm. A 110 dtex polyamide Thunderon® yarn was used as the bobbin thread in 301 lock stitch and 406 construction cover stitch to manufacture various garments, such as shirts, trousers, T-shirts, and jackets.

The prepared samples with interlock and overlock seams produced with Thunderon® monofilament yarn had similar seam strengths to samples stitched with standard threads. The seam strength of seams containing Thunderon® yarn was similar to the standard samples. Five shirts and five pairs of trousers were successfully produced using commercial garment assembly techniques. Thunderon® thread was used as a bobbin thread in lockstitch seams and as a looper thread in chainstitch seams. Buttons, tags, pockets and zips were also sewed on the garments without any difficulties. Seam strength was sufficient for all the samples.

The garments were placed in a domestic microwave oven for 10 s, which caused the mechanical failure of all the textile joints of the garments without damage or discoloration to the garments. When the Thunderon® yarn was used only in the stitching of pockets on to base garments, these pockets could be readily removed after microwave irradiation with no signs of thermal damage to the underlying fabric.

In addition, metal zips and other metallic accessories that had been sewn in to the garment could be readily removed. No arching was observed during microwave irradiation, partly because of the short exposure time of 10 s.

Example 3

A metallised embroidery and decorative thread from Madeira UK Ltd, FS No. 50, was used as in example 1 with similar results. This 2-ply thread consisted 45% of Polyamide filament and 55% of a metallised polyester foil. Overlock stitch samples were also prepared that are commonly used in garment production using Madeira metallised thread FS 50. Samples with buttons were also prepared. Microwave testing for durations of ≤10 seconds led to a decrease in the detachment force (seam strength) of over 80% enabling the fabric pieces to be readily separated manually. There was no significant thermal damage and discoloration to the articles.

Example 4

Polyamide multifilament yarns containing a layer of copper sulphide were obtained with linear densities of 121 dtex/24 F (filaments) and ca. 110 dtex/24 F. The specific resistance of these yarns was ca. $10^{-1}$-$10^{-2}$ Ω·cm and the filament tenacity was ca. 4.5 g/den (grams per denier). The yarn strength enabled these yarns to be utilized directly in sewing operations without end breakages. However, to facilitate high speed sewing or embroidery operation as well as provide a means of modifying the colour and appearance of the yarn, plied yarn assemblies were constructed. Using a hollow spindle up-twisting machine the 110 dtex/24 F yarn was twisted with a 50 dtex textured polyester yarn in both the S-direction and Z-direction to produce a double-covered yarn assembly of balanced twist. A yarn linear density of 50 dtex was approximately the minimum required to satisfactorily disguise the core yarn component during the twisting operation. Thus, by twisting two or more additional yarns around the polyamide multifilament yarn containing a layer of copper sulphide, the filaments could be mechanically protected from subsequent abrasion and hidden from view, such that the colour, handle, appearance, softness and general aesthetics of the yarn were dependent on the yarns twisted around it. A particularly suitable construction for sewing thread use was produced by twisting at least two additional yarns composed of cotton around a Thunderon 110 dtex/24 F polyamide multifilament yarn containing a layer of copper sulphide such that this yarn became a core hidden by the two or more yarns twisted around it. The linear density and number of covering yarns employed influences the extent to which the core is disguised. As a result of covering the core with yarns containing cotton, the resulting yarn surface was soft and hydrophilic as was suitable for yarn colouration or chemical finishing. Additionally, yarn strength exceeded 4.5 g/den with an elongation at break between 12-24% depending on twist level facilitating its use in sewing and embroidery operations.

Each of the filament samples and yarns were exposed to microwave energy operating at domestic wavelength and at power of 700 W for a duration of 10 s and were found to be subject to a reduction in tensile strength of >90%. The yarns having the lowest linear densities (g/1000 m) were found to produce the lowest residual breaking loads, and therefore enabled the largest decreases in seam strength after microwave exposure at domestic frequency for ≤10 seconds.

Garments manufactured with the cotton yarn covered polyamide multifilament containing copper sulphide thread were found to be more comfortable to users than those manufactured without the cotton yarn cover. Additionally, the cotton component could be dyed (prior to or after combination with polyamide multifilament containing copper sulphide thread) to match the base colour of the underlying fabric.

All of the features disclosed in this specification for each and every embodiment and arrangement (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. An article susceptible to automatic or semi-automatic disassembly, which comprises at least two components, at least one of which comprises a textile material, the at least two components in communication with each other through one or more connectors, wherein one or more mechanical properties of the one or more connectors are reduced on exposure to electromagnetic energy, wherein the one or more connectors comprise a filament staple having one or more filaments, yarns or staples or a combination thereof said filament staple having a structure/form which comprises one or more organic materials coated and/or chemically bonded with one or more electromagnetic radiation susceptible or conductive additives or materials which on exposure to electromagnetic radiation transfer heat to said one or more organic materials degrading their mechanical properties and wherein said electromagnetic radiation falls within a radio frequency range or a microwave frequency range.

2. An article as claimed in claim 1, wherein at least one of the said at least two components is one or more textile and/or non-textile based labels secured to a textile component.

3. An article as claimed in claim 1, wherein at least one of the said at least two components comprises a non-textile material, such as a metal button or zip secured to a textile component.

4. An article as claimed in claim 1, wherein at least two of the said at least two components comprises a textile material.

5. An article as claimed in claim 1, wherein at least one of the said at least two components comprises the connector, susceptible to a reduction in one or more mechanical properties under exposure of the article to electromagnetic energy, and which filament staple is in the form of an embroidered label or logo.

6. An article as claimed in claim 5, wherein any non-label or logo related connectors are not susceptible to a reduction in one or more mechanical properties under exposure of the article to electromagnetic energy.

7. An article as claimed in claim 1, wherein said communication between article components is a seam, embroidery, sown or stitched joint.

8. An article as claimed in claim 1, wherein the article is a hat, gloves, shoes, socks, badges, labels, seat-covers, furnishings, car headliners, mattress covers and tickings, bedding including pillows and duvets, sheets, parachutes, airbags, composites, medical, healthcare and industrial products.

9. An article as claimed in claim 1, wherein the filament staple comprises two components each of a different material, one being susceptible to being heated on exposure to electromagnetic radiation and the second being relatively unaffected by such exposure.

10. An article as claimed in claim 1, wherein the filament staple comprises one or more of a filament, staple, or yarn and comprises a bi-component material and wherein electromagnetic radiation susceptible material is present in one or more of its constituent components.

11. An article as claimed in claim 1, wherein at least one of said connectors comprises one or more organic polymeric components.

12. An article as claimed in claim 1, wherein said structure/form of said filament staple or yarn comprises one or more organic materials chemically bonded with one or more electromagnetic susceptible or conductive materials, which on exposure to electromagnetic radiation transfer heat to said organic materials degrading their mechanical properties.

13. An article as claimed in claim 1, wherein said structure/form of said filament staple or yarn comprises a core/sheath structure with at least said sheath comprising one or more materials susceptible to electromagnetic radiation, which on exposure to electromagnetic radiation transfer heat to an organic core materials degrading said organic core materials mechanical properties.

14. An article as claimed in claim 1, wherein said structure/form of said filament staple or yarn comprises a core/sheath structure with at least said core material comprising one or more materials susceptible to electromagnetic radiation, which on exposure to electromagnetic radiation transfer heat to an organic sheath material degrading said organic sheath materials mechanical properties.

15. An article as claimed in claim 1, wherein at least one of said connectors comprises a multi-ply yarn comprising at least one filament yarn susceptible to exposure to electromagnetic radiation, and wherein the multi-ply yarn comprises two or more filaments or combinations of filament and staple yarns.

16. An article as claimed in claim 15, wherein said one filament yarn susceptible to exposure to electromagnetic radiation is covered by one or more filaments of one or more staple yarns.

17. An article as claimed in claim 16, wherein a staple yarn is cotton.

18. An article as claimed in claim 1, wherein the connector comprises multi-ply yarns comprising filaments containing at least one metallic compound other than steel.

19. An article as claimed in claim 1, wherein at least one of the said connectors comprises multi-ply yarns comprising filaments that are free of elemental carbon, carbon black or graphite.

20. An article as claimed in claim 1, wherein one or more of said connectors comprises a metal sulphide susceptible to exposure to electromagnetic radiation, which on exposure to electromagnetic radiation degrades their mechanical properties.

21. An article as claimed in claim 1, comprising a metal sulphide.

22. An article as claimed in claim 1, wherein at least one component as the component susceptible to exposure to electromagnetic radiation comprises one or more of an acrylic, polyamide, polyester or polyamide acrylic containing a metal sulphide.

23. An article as claimed in claim 1, wherein the connector comprises one or more materials having a specific resistivity within a range of $10^{-5}$-$10^{11}$ Ω·cm.

24. An article as claimed in claim 1, wherein at least one of the said connectors comprises as a component susceptible to exposure to electromagnetic radiation one or more materials that are pseudo-conductive materials.

25. An article as claimed in claim 1, wherein the connector is a material that exhibits reduction in mechanical properties when exposed to a microwave power density of 0.060 w/cm$^{-3}$ or less.

26. An article as claimed in claim 1, comprising copper sulphide.

27. An article as claimed in claim 1, wherein at least one component as a component susceptible to exposure to electromagnetic radiation comprises copper sulphide material.

28. An article as claimed in claim 1, wherein at least one of the one or more connectors comprises one or more materials having a specific resistivity within a range of $10^{-5}$-$10^{5}$ Ω·cm.

29. An article as claimed in claim 1, wherein at least one of the one or more connectors comprises one or more materials having a specific resistivity within a range of $10^{-5}$-$10^{0}$ Ω·cm.

30. An article as claimed in claim 1, wherein at least one of the one or more connectors comprises one or more materials having a specific resistivity within a range of $10^{-4}$-$10^{0}$ Ω·cm.

31. An article as claimed in claim 1, wherein at least one of the one or more connectors comprises one or more materials having a specific resistivity within a range of $10^{-3}$-$10^{0}$ Ω·cm.

32. An article as claimed in claim 1, wherein at least one of the one or more connectors is a material that exhibits reduction in mechanical properties when exposed to a microwave power density of 0.050 w/cm$^{-3}$ or less.

33. An article as claimed in claim 1, wherein at least one of the one or more connectors is a material that exhibits reduction in mechanical properties when exposed to a microwave power density of 0.047 w/cm$^{-3}$ or less.

34. An article as claimed in claim 1, wherein at least one of the one or more connectors is a material that exhibits reduction in mechanical properties when exposed to a microwave power density of 0.040 w/cm$^{-3}$ or less.

35. An article as claimed in claim 1, wherein at least one of the one or more connectors is a material that exhibits reduction in mechanical properties when exposed to a microwave power density within a range of 0.001 w/cm$^{-3}$ and 0.04 w/cm$^{-3}$.

* * * * *